United States Patent
Bhat

(10) Patent No.: US 11,930,014 B2
(45) Date of Patent: Mar. 12, 2024

(54) INFORMATION SECURITY USING MULTI-FACTOR AUTHORIZATION

(71) Applicant: Bank of America Corporation, Charlotte, NC (US)

(72) Inventor: Shubhada Bhat, Wokingham (GB)

(73) Assignee: Bank of America Corporation, Charlotte, NC (US)

( * ) Notice: Subject to any disclaimer, the term of this patent is extended or adjusted under 35 U.S.C. 154(b) by 139 days.

(21) Appl. No.: 17/449,432

(22) Filed: Sep. 29, 2021

(65) Prior Publication Data

US 2023/0098153 A1 Mar. 30, 2023

(51) Int. Cl.
*H04L 29/06* (2006.01)
*H04L 9/40* (2022.01)

(52) U.S. Cl.
CPC ........ *H04L 63/101* (2013.01); *H04L 63/0838* (2013.01); *H04L 63/102* (2013.01); *H04L 63/20* (2013.01)

(58) Field of Classification Search
CPC ... H04L 63/101; H04L 63/20; H04L 63/0838; H04L 63/105; H04L 63/107
USPC .......................................................... 726/1
See application file for complete search history.

(56) References Cited

U.S. PATENT DOCUMENTS

| | | | |
|---|---|---|---|
| 7,873,572 B2 | 1/2011 | Reardon | |
| 8,495,720 B2 | 7/2013 | Counterman | |
| 8,560,449 B1 | 10/2013 | Sears | |
| 8,639,623 B2 | 1/2014 | Kavanagh et al. | |
| 8,646,060 B1 | 2/2014 | Ben Ayed | |
| 8,769,289 B1 | 7/2014 | Kronrod | |
| 8,769,643 B1 | 7/2014 | Ben Ayed | |
| 9,032,498 B1 | 5/2015 | Ben Ayed | |
| 9,129,120 B2 * | 9/2015 | Garcia | H04L 63/04 |
| 9,531,702 B2 | 12/2016 | Grim et al. | |
| 9,578,022 B2 | 2/2017 | Salonen | |
| 9,935,953 B1 | 4/2018 | Costigan et al. | |
| 10,122,719 B1 | 11/2018 | Vltavsky et al. | |
| 10,212,588 B2 | 2/2019 | Grim et al. | |
| 10,225,242 B2 | 3/2019 | Grim et al. | |
| 10,270,774 B1 | 4/2019 | Berman et al. | |
| 10,375,082 B2 | 8/2019 | Brown et al. | |
| 10,462,126 B2 | 10/2019 | Kurian et al. | |

(Continued)

FOREIGN PATENT DOCUMENTS

| CA | 2896681 C | 10/2017 |
|---|---|---|
| CN | 102301642 A | 12/2011 |

(Continued)

*Primary Examiner* — Longbit Chai

(57) ABSTRACT

A system includes a central server and one or more user devices connected by a network. The central server receives a request initiated by a user using a user device for a data interaction associated with a data file. The central server checks whether the user is authorized to perform the requested data interaction based on a list of user authorizations. If the user is authorized to perform the data interaction, the central server checks whether the data interaction satisfies at least one rule defined for the user relating to a type of the requested data interaction. If the data interaction satisfies the at least one rule, the central server performs an additional level of authorization to verify an identity of the user. The central server further processes the data interaction when the additional level of authorization is successful.

15 Claims, 3 Drawing Sheets

(56) References Cited

U.S. PATENT DOCUMENTS

| | | | |
|---|---|---|---|
| 10,462,665 B2 | 10/2019 | Kurian et al. | |
| 10,587,423 B2 * | 3/2020 | Nagaratnam | H04L 63/08 |
| 10,701,081 B2 | 6/2020 | Grim et al. | |
| 10,755,507 B2 | 8/2020 | Zwink et al. | |
| 2001/0045451 A1 | 11/2001 | Tan et al. | |
| 2007/0150942 A1 | 6/2007 | Cartmell | |
| 2013/0151411 A1 | 6/2013 | Carten | |
| 2013/0151413 A1 | 6/2013 | Sears | |
| 2013/0168442 A1 * | 7/2013 | Little | G06F 16/23 235/375 |
| 2014/0282993 A1 | 9/2014 | Van Till et al. | |
| 2016/0189136 A1 | 6/2016 | Mercille | |
| 2017/0201781 A1 * | 7/2017 | Itwaru | H04N 21/4788 |
| 2019/0364028 A1 | 11/2019 | Sanjeevaiah Krishnaiah | |
| 2020/0127858 A1 | 4/2020 | St?hr et al. | |
| 2020/0329051 A1 | 10/2020 | Grim et al. | |
| 2020/0351264 A1 | 11/2020 | Pellizzer et al. | |

FOREIGN PATENT DOCUMENTS

| | | |
|---|---|---|
| CN | 102187701 B | 6/2014 |
| CN | 103942685 A | 7/2014 |
| CN | 103944730 A | 7/2014 |
| CN | 103944908 A | 7/2014 |
| CN | 103259667 B | 5/2016 |
| CN | 106416336 A | 2/2017 |
| CN | 105608577 B | 2/2020 |
| EP | 3108397 B1 | 3/2019 |
| EP | 3304847 B1 | 7/2019 |
| JP | 6586446 B2 | 10/2019 |
| WO | 2017042023 A1 | 3/2017 |

* cited by examiner

INFORMATION SECURITY USING MULTI-FACTOR AUTHORIZATION

TECHNICAL FIELD

The present disclosure relates generally to data processing, and more specifically to information security using multi-factor authorization.

BACKGROUND

Multi-factor authentication is an electronic authentication method in which a user is granted access to a resource (e.g., network, device, application, data etc.) after successfully presenting two or more pieces of evidence (or factors). Authentication usually occurs when the user attempts to access the resource via a computing device. Access to the resource may require the user to supply an identity (e.g., username) by which the user is known to the resource, along with evidence of the authenticity of the user's claim to that identity. Simple authentication requires only one such piece of evidence or factor, typically a password. For additional security, the resource may require more than one factor (multi-factor authentication). For example, a two-factor authentication requires the user to provide two pieces of evidence to gain access to the resource. The authentication factors of a multi-factor authentication scheme may include a physical object in the possession of the user (e.g., a USB security stick, a security card, a key etc.), knowledge only known to the user (e.g., password, Personal Identification Number (PIN) etc.) and biometrics of the user (e.g., fingerprint, eye iris, voice etc.).

SUMMARY

The system and methods implemented by the system as disclosed in the present disclosure provide enhanced information security. The disclosed system and methods provide several practical applications and technical advantages. For example, the disclosed system provides the practical application of providing enhanced information security by authorizing a requested data interaction associated with a data file using multi-factor authorization. For example, as described in accordance with one or more embodiments of the present disclosure, a central server may implement multi-factor authorization for certain data interactions associated with a data file by requiring a requesting user to provide multiple pieces of evidence (factors) to prove user identity before processing a requested data interaction. For example, upon receiving a request for a data interaction (e.g., data transfer) associated with the data file, the central server first checks whether the user requesting the data interaction is authorized to perform the requested type of data interaction (e.g., the data transfer), based on user authorizations. When the user is determined to have authorization to perform the requested type of data interaction, the central server additionally checks if one or more user-configured rules have been defined for the requesting user in relation to the requested type of data interaction. For example, the central server may search for user-configured rules defined for the user based on authentication credentials (e.g., username) of the user. When the central server finds a user-configured rule defined for the user relating to the requested type of data interaction, the central server checks whether the requested data interaction satisfies a condition defined by the user-configured rule. For example, when the user-configured rule defines that enhanced authorization is to be performed when a requested data transfer equals or exceeds a set threshold data amount, the central server checks whether the amount of requested data transfer from data file equals or exceeds the threshold data amount. If yes, the central server performs an additional level of authorization to verify the identity of the user. The central server may further process the requested data interaction upon successfully verifying the identity of the user based on performing the additional level of authorization.

The multi-factor authorization provides an enhanced level of protection against unauthorized access to the data file. For example, when the initial user authentication credentials (e.g., username and password) used to open a data interaction session with the central server are compromised, the enhanced authorization may avoid the data file from being compromised by avoiding unauthorized data access and/or data loss. Further, the user configured rules allow a user to customize the triggering of the additional authorization according to user preferences. As described in accordance with embodiments of the present disclosure, the user may define user-configured rules so that the enhanced authorization is triggered for particular types of data interactions and not for all types of data interactions. This allows a user to set enhanced authorization particularly for sensitive data interactions. For example, the user may define user configured rules that trigger enhanced authorization for data transfers from the data file, but not for transferring data into the data file or generating reports of previous data interactions. Additionally, the user may set the enhanced authorization for high value data interactions. the user may define a user configured rule for a data transfer from the data file that equals or exceeds a set threshold amount of data (e.g., a set number of data objects). The user may increase or decrease the threshold on a need basis based on what amount of data the user considers high value at any time. By allowing the user to define user configured rules that trigger enhanced authorization for particular data interactions and not for all data interactions, the central server improves user experience by not needing the user to perform additional authorization operations to process every data interaction.

In one or more additional embodiments, the central server may be configured to send out a notification to a user device registered for the user at the central server, of an attempt for a data interaction associated with the data file. The notification notifies the registered user of the data file that a particular data interaction in being attempted. The central server may be configured to send out the notification after determining that the requested data interaction satisfies a user-configured rule but before invoking additional authorization based on the user-configured rule and also before fully processing the data interaction. The notification provides another layer of security to the data file in case a perpetrator is able to surpass the multi-factor authorization. When the user receives notification regarding an attempt for a data interaction not initiated by the user, the user may take appropriate actions to report and/or stop the data interaction from being processed further. For example, the user may block all data interactions associated with the data file using an application on the user device and/or call a representative of the central server to report that a fraudulent data interaction being attempted.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
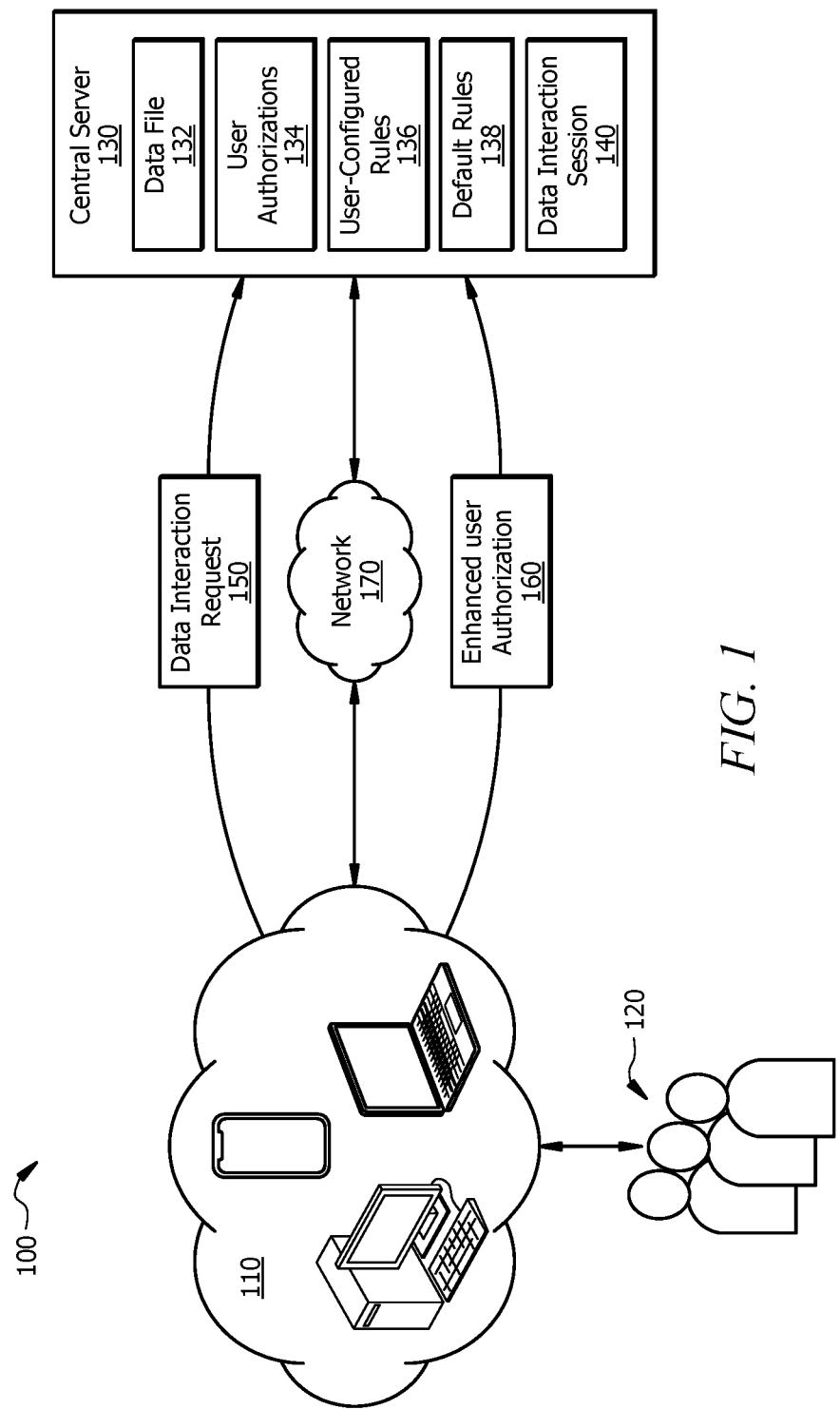
FIG. 1 is a schematic diagram of an example data processing system, in accordance with certain aspects of the present disclosure.

FIG. 1 is a schematic diagram of an example data processing system 100, in accordance with certain aspects of the present disclosure.

As shown in FIG. 1, data processing system 100 may include one or more user devices 110 and a central server 130, each connected to a network 170. The network 170, in general, may be a wide area network (WAN), a personal area network (PAN), a cellular network, or any other technology that allows devices to communicate electronically with other devices. In one or more embodiments, the network 170 may be the Internet. Each user device 110 may be operated by one or more users 120.

The central server 130 may be configured to provide one or more data processing services to users 120 registered with the central server 130. For example, a user 120 may be registered with the central server 130 and may be configured to receive the one or more data processing services provided by the central server 130. Registered users 120 may access the one or more data processing services provided by the central server 130 using one or more user devices 110 such as a wearable computing device (e.g., a smart watch), a portable computing device (e.g., smartphone, tablet computer etc.), a laptop computer, a desktop computer or the like.

The data processing services provided by the central server 130 may include, but are not limited to, data cloud storage services, software hosting services, media streaming services, networking services, web services and banking services.

In one or more embodiments, the central server 130 may be part of a computing infrastructure including several data servers (including the central server 130) connected to the network 170. The computing infrastructure may be owned and implemented by an organization including, but not limited to, a software hosting service provider, a media streaming service provider, a cloud services provider, a networking service provider, a web hosting service provider, a retail corporation, and a banking corporation. For example, the computing infrastructure may be implemented by a cloud data service provider where the central server 130 stores user data, provides access to the stored user data and allows one or more data interactions to be performed relating to the stored user data.

In one or more embodiments, a user 120 may be registered with the central server 130 and may be configured to receive data processing services provided by the central server 130 via one or more user devices 110. For example, the user 120 may be registered with the central server 130 to store a data file 132 at the central server 130. The registration with the central server 130 allows the user 120 to store data in the data file 132, and to perform one or more data interactions related to the data stored in the data file 132 as supported by the central server 130. For example, the user 120 may transfer data into and out of the data file 132. In an alternative embodiment, registration with the central server 130 may allow a user 120 to perform one or more data interactions related to one or more data files 132 not owned by the user and/or not storing user data of the user 120.

User data stored in the data file 132 may include, but is not limited to, personal information related to the user (e.g., user name, age, social security number, email address, phone number etc.), user identification data including a username or login name, authentication password, ID card number, driving license number, user biometrics data (e.g., fingerprints, face recognition pattern etc.), and information related to the data file 132 including a data file name and other properties of the data file 132. In one embodiment, user data in the data file 132 may include a number of data objects. Each data object may be associated with a user credit value, wherein a higher number of data objects in the data file 132 represents a higher user credit value.

A user device 110 operated by a user 120 may be configured to facilitate and manage data processing interactions with the central server 130, as described below. A user device 110 may include any device that includes a communication interface for communicating with the central server 130 over the network 170. A user device 110 may additionally include a user interface including for example, a display and a user input means (e.g., keypad, touch screen etc.), to allow user interaction of a user 120 with the user device 110. For example, the user device 110 may include, but is not limited to, one or more of a wearable computing device (e.g., a smart watch), a portable computing device (e.g., smartphone, tablet computer etc.), a laptop computer, a desktop computer and the like. User device 110 may communicate with the central server 130 over the network 170 using any known wired or wireless technology. One or more user devices 110 may be registered as an authorized device with the central server 130. The registration allows a user device 110 to perform certain data processing interactions with the central server 130. Examples of data interactions that a user 120 (e.g., using a user device 110) may perform associated with the data file 132 may include, but are not limited to, viewing a status of the data file 132 (e.g., number of data objects stored in the data file 132), generating a report of data interactions related to the data file 132 previously processed in a given time period, transferring data (e.g., a requested number of data objects) from the data file 132 and transferring data (e.g., a requested number of data objects) into the data file 132.

In one or more embodiments, each of the central server 130 and user devices 110 may be implemented by a computing device running one or more software applications. For example, one or more of the central server 130 and user devices 110 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the central server 130 and user devices 110 may be representative of a server running one or more software applications to implement respective functionality as described below. In certain embodiments, one or more of the central server 130 and user devices 110 may run a thin client software application where the processing is directed by the thin client but largely performed by a central entity such as a server (not shown).

Multiple users 120 may be registered at the central server 130 to perform one or more data interactions associated with the same data file 132. When multiple users 120 are registered to perform data interactions with the same data file 132, different users may have different levels of authorization. For example, a primary user (e.g., administrator) of the data file 132 may have a highest level of authorization and can perform all data interactions offered by central server 130 for the data file 132. A secondary user of the data file may have a lower level of authorization as compared to the primary user, and can perform only a subset of the data interactions offered for the data file 132. In one example, a primary user 120 of the data file 132 may view the contents of the data file 132, transfer data out of and into the data file 132, generate reports of previous data interactions performed for the data file 132, configure authorizations for secondary users, set user configured rules 136 for all users 120 of the data file, and modify user data including contact details, passwords etc. A secondary user 120 of the data file 132, however, may only view the contents of the data file 132 and generate reports of previous data interactions performed for the data file 132. In one embodiment, the primary user may configure authorization for each secondary user, including the one or more data interactions that can be performed by the secondary user. Authorizations for each registered user 120 of the data file 132 may be stored at the central server 130 as user authorizations 134. For each registered user 120 of the data file 132, user authorizations 134 may include one or more data interactions the user 120 is authorized to perform with regard to the data file 132. The user authorizations 134 may include authorization information of each registered user 120 mapped to a unique identity of the user 120 as registered with the central server 130. The unique identity may include a username, or a combination of a username and password registered for the user 120 at the central server 130.

A user 120 may initiate a data interaction associated with data file 132 using a user device 110. To initiate the data interaction, the user 120 may first establish a data interaction session 140 at central server 130 using a software application provided at the user device 110. In one embodiment, the software application may be a dedicated application designed for interaction with the central server 130. In alternative embodiments, the user may access the central server 130 using a web portal. To establish the interaction session 140 at the central server 130, the user may provide authentication credentials to the central server 130 via the user device 110. In one example, the authentication credentials include an initial username and password registered for the user 120 at the central server 130. For example, the user 120 may enter the username and password on a login page displayed on a display of the user device 110. The central server 130 may be configured to verify the identity of the user 120 based on the provided authentication credentials. Once the identity of the user 120 is authenticated, the central server 130 may open an interaction session 140 for the user 120. The user 120 may manage the interaction session 140 with the central server 130 using the user device 110. Once the interaction session 140 is established at the central server 130, the user may initiate one or more data interactions associated with the data file 132 by transmitting a data interaction request 150 to the central server 130. For example, the central server 130 may offer a number of data interactions related to the data file 132. As described above, the data interactions may include, but are not limited to, viewing a status of the data file 132 (e.g., number of data objects stored in the data file 132), generating a report relating to data interactions related to the data file 132 previously processed in a given time period, transferring data (e.g., a requested number of data objects) from the data file 132, transferring data (e.g., a requested number of data objects) into the data file 132, configuring user authorizations 134, defining user configured rules 136, and modifying user data including contact details, passwords etc.

Central server 130 may be configured to check whether the user 120 is authorized to perform a data interaction associated with the data file 132 as requested by the user 120. Upon receiving a data interaction request 150 initiated by user 120 for a data interaction associated with the data file 132, the central server 130 may be configured to search the user authorizations 134 for an authorization level of the requesting user 120 based on authentication credentials provided by the user 120 at the time of setting up the current interaction session 140 at the central server 130. As described above, the user authorizations 134 may include authorization information of each registered user 120 mapped to a unique identity (e.g., authentication credentials) of the user 120 as registered with the central server 130. Based on the authentication credentials of the user 120, the central server 130 may examine the data interactions the user 120 is authorized to perform with regard to the data file 132, and may determine whether the user 120 is authorized to perform the requested data interaction. The central server 130 may allow further processing of the requested data interaction when the user 120 is determined to have authorization to perform the requested data interaction with regard to the data file 132. For example, a user 120 may open an interaction session 140 at the central server 130 by providing a username and password registered for the user 120 at the central server 130. Once the interaction session 140 is open, the user may request (e.g., by transmitting a data interaction request 150) that a certain amount of data is transferred from the data file 132 to another data file (not shown) stored at the central server or to another data server (not shown) connected to network 170. In response to receiving the request 150 for the data transfer, the central server 130 may search the user authorizations 134 based on the username of the user 120 to determine an authorization level of the user 120. As described above, for each registered user 120, user authorizations 134 may include one or more data interactions the user 120 is authorized to perform with regard to the data file 132. Based on the authorization level of the user as determined from the user authorizations 134, the central server 130 may determine whether the user 120 is authorized to perform the requested data transfer from the data file 132.

In one or more embodiments, the authorization level of the user may impose limits on certain data interactions the user is authorized to perform. For example, a user 120 may not be authorized to transfer data out of the data file that exceeds a pre-set amount of data (e.g., a pre-set number of data objects).

Central server 130 may be configured to perform enhanced user authorization 160 including performing one or more additional levels of user authorization to verify the identity of the user before processing a requested data interaction associated with the data file 132. The additional level of user authorization may include, but is not limited to, one or more of requesting a One Time Password (OTP) previously sent to at least one registered user device 110 of the user 120, requesting a biometric identification of the first user, requesting a registered data interaction password, requesting an answer to a pre-set secret question and requesting confirmation of an identity of the user 120 over a phone call. It may be appreciated that the additional level of user authorization may include any other known method of user authorization.

Central server 130 may be configured to trigger an additional level of user authorization based on one or more user-configured rules 136. Each user-configured rule 136 may be set by a registered user 120 and specifies at least one condition for triggering the additional user authorization. Each user-configured rule 136 is associated with at least one type of data interaction and specifies at least one condition for triggering additional authorization to process a requested data interaction of the at least one type. The different types of data interactions may include, but are not limited to, viewing a status of the data file 132 (e.g., number of data objects stored in the data file 132), generating a report relating to data interactions related to the data file 132 previously processed in a given time period, transferring data (e.g., a requested number of data objects) from the data file 132, transferring data (e.g., a requested number of data objects) into the data file 132, configuring user authorizations 134, defining user-configured rules 136, and modifying user data including contact details, passwords etc. When the at least one condition is met for a requested data interaction, the central server 130 may be configured to perform an additional level of authorization using one or more authorization methods and further process the requested data interaction upon successfully authorizing the identity of the user 120 based on the additional level of authorization. For example, a user-configured rule 136 may specify that any data transfer from the data file 132 that equals or exceeds a preset amount of data (e.g., preset number of data objects) is to trigger additional authorization. In this example, "data transfer" is the type of data interaction, and the condition set by the user configured rule 136 is that "transfer from the data file 132 equals or exceeds a preset amount of data". Thus, each time a data transfer from the data file 132 is requested that equals or exceeds the preset number of data objects, the central server 130 may trigger and perform the additional authorization. In one or more embodiments, a single user-configured rule 136 may apply to multiple types of data interactions. For example, a user-configured rule 136 may specify that any data transfer from the data file 132 or data transfer into the data file 132 that equals or exceeds a preset number of data objects is to trigger additional authorization.

When multiple users 120 are registered to perform data interactions associated with same data file 132, different user-configured rules 136 may be defined for each of the multiple users 120 with respect to the same type of data interaction associated with the data file 132. For example, a first user-configured rule 136 defined for a first registered user may specify that any data transfer initiated by the first user from the data file 132 that equals or exceeds a first amount of data (e.g., first number of data objects) is to trigger additional authorization. A second user-configured rule 136 defined for a second registered user may specify that any data transfer initiated by the second user from the data file 132 that equals or exceeds a second amount of data (e.g., second number of data objects is to trigger additional authorization. The second amount of data may be different from the first amount of data. In one embodiment, a user 120 registered as a primary user of the data file 132 may be authorized to define the user-configured rules 136 for all users 120 of the data file 132. In an alternative embodiment, a user 120 registered as a secondary user of the data file may define additional user-configured rules 136 for the secondary user in addition to one or more user-configured rules 136 set for the secondary user by the primary user. The central server 130 may store each user-configured rule 136 mapped to the authentication credentials of the user 120 to which the user-configured rule 136 applies. For example, the first user-configured rule 136 may map to the username of the first user and the second user-configured rule 136 may map to the username of the second user. The central server 130 may be configured to search for user-configured rules 136 defined for a particular user based on the authentication credentials (e.g., username) of the user.

In one or more embodiments, the central server 130 may be configured to use enhanced user authorization 160 (e.g., including additional level of authorization) based on user-configured rules 136 in addition to the initial authorization of a requested data interaction based on user authorizations 134. Thus, the central server 130 may implement multi-factor authorization for certain data interactions by requiring a requesting user 120 to provide multiple pieces of evidence (factors) to prove user identity before processing a requested data interaction. For example, upon receiving a request 150 for a data interaction (e.g., data transfer) associated with the data file 132, the central server 130 first checks whether the user 120 requesting the data interaction is authorized to perform the requested type of data interaction (e.g., the data transfer), based on user authorizations 134. When the user 120 is determined to have authorization to perform the requested type of data interaction, the central server additionally checks if one or more user-configured rules 136 have been defined for the requesting user 120 in relation to the requested type of data interaction. For example, the central server 130 may search for user-configured rules 136 defined for the user 120 based on the authentication credentials (e.g., username) of the user. When the central server 130 finds a user-configured rule 136 defined for the user 120 relating to the requested type of data interaction, the central server 130 checks whether the requested data interaction satisfies a condition defined by the user-configured rule 136. For example, when the user-configured rule 136 defines that enhanced authorization 160 is to be performed when a requested data transfer equals or exceeds a set threshold data amount, the central server 130 checks whether the amount of requested data transfer from data file 132 equals or exceeds the threshold data amount. If yes, the central server 130 performs an additional level of authorization to verify the identity of the user. The central server 130 may further process the requested data interaction upon successfully verifying the identity of the user 120 based on performing the additional level of authorization. On the other hand, when the requested data interaction fails to satisfy the condition of the user-configured rule 136, the central server 130 may further process the requested data interaction without performing an additional level of authorization.

The multi-factor authorization provides an enhanced level of protection against unauthorized access to the data file 132. For example, when the initial user authentication credentials (e.g., username and password) used to open a data interaction session 140 at the central server 130 are compromised, the enhanced authorization 160 may avoid the data file 132 from being compromised by avoiding unauthorized data access and/or data loss. Further, the user configured rules 136 allow a user 120 to customize the triggering of the additional authorization according to user preferences. As described above, the user 120 may define user configured rules 136 so that the enhanced authorization 160 is triggered for particular types of data interactions and not for all types of data interactions. This allows a user 120 to set enhanced authorization 160 particularly for sensitive data interactions. For example, the user 120 may define user configured rules 136 that trigger enhanced authorization 160 for data transfers from the data file 132, but not for transferring data into the data file 132 or generating reports of previous data interactions. Additionally, the user 120 may set the enhanced authorization 160 for high value data interactions. For example, as discussed above, the user 120 may define a user configured rule 136 for a data transfer from the data file 132 that equals or exceeds a set threshold amount of data (e.g., a set number of data objects). The user 120 may increase or decrease the threshold on a need basis based on what amount of data the user considers high value at any time. By allowing the user 120 to define user configured rules 136 that trigger enhanced authorization 160 for particular data interactions and not for all data interactions, the central server 130 improves user experience by not needing the user to perform additional authorization steps to process every data interaction.

Default rules 138 may be defined to trigger enhanced authorization 160 for certain data interactions associated with the data file 132 which apply to all registered users 120 of the data file 132. In one embodiment, a default rule may be defined to avoid unauthorized access to the data file 132, avoid considerable data loss and/or loss of reputation as a result of losing sensitive data from the data file 132. For example, a default rule 138 may be defined to trigger enhanced authorization 160 for a data transfer from the data file 132 that equals or exceeds a set threshold amount of data. This default rule 138 may be applied to every registered user 120 of the data file 132 who requests a data transfer from the data file 132. The threshold amount of the default rule may be set to a data amount (e.g., number of data objects) which, if lost, may be generally considered high value data loss. In another example, a default rule 138 may be defined to trigger enhanced authorization 160 for access to sensitive data including personal user information and/or information related to the data file 132. In an embodiment, the default rules 138 may be set by an administrator of the central server 130.

Default rules 138 may include location-based rules that trigger enhanced authorization 160 when a data interaction associated with the data file 132 is initiated from a suspicious location. The central server 130 may determine a geographical location of a user device 110 used to initiate a data interaction based on several methods including, but not limited to, geo-location data received from the user device 110 and an internet protocol (IP address) of the user device 110. When a location of the user device 110 is found to be suspicious (e.g., outside a country of usual operation), the central server 130 may trigger the enhanced authorization 160. In another example, when two different user devices 110 use the same user authentication credentials to establish data interaction sessions 140 from two distant geographical locations within a relatively short time period, the central server 130 may determine the activity as suspicious and trigger enhanced authorization 160.

In one or more embodiments, a default rule 138 defined for a particular type of data interaction may be overridden by a user-configured rule 136 defined for a particular user 120 in relation to the same type of data interaction. In one embodiment, the user-configured rule 136 may override a default rule 138 when the user-configured rule 136 defines a higher security standard for triggering the enhanced authorization 160 for the same type of data interaction. For example, a default rule 138 may specify that enhanced authorization 160 is triggered when a requested data transfer (e.g., by any user) from the data file 132 equals or exceeds 1000 data objects. A user-configured rule 136 defined for a first user of the data file 132 may specify that the enhanced authorization 160 is triggered when the requested data transfer, when initiated by the first user, equals or exceeds 500 data objects. In this case, since the user-configured rule 136 sets a higher security standard by requiring that the enhanced authorization 160 is triggered for a lower data threshold as compared to the higher data threshold set by the default rule, the central server 130 may ignore the default rule 138 for the first user and implement the user-configured rule 136. In one embodiment, a user-configured rule 136 may not override a default rule 138 when the user-configured rule 136 sets a lower security standard for a data interaction. For example, when the default rule 138 sets the threshold data amount for the data transfer at 1000 data objects and the user-configured rule 136 sets the threshold data amount to 1500 data objects, the central server 130 may implement the default rule 138 instead of the user-configured rule 136 for the first user.

The central server 130 may be configured to send out a notification to a user device 110 registered for the user 120 at the central server 130, of an attempt for a data interaction associated with the data file 132. The notification notifies a registered user 120 of the data file 132 that a particular data interaction in being attempted. The central server 130 may be configured to send out the notification after determining that the requested data interaction satisfies a user-configured rule but before invoking additional authorization based on the user-configured rule and also before processing the data interaction. The notification provides another layer of security to the data file 132 in case a perpetrator is able to surpass the multi-factor authorization. The central server 130 may be configured to send out the notification to a user device (e.g., a mobile phone) of the user 120 whose authentication credentials were used to initiate the data interaction. In an alternative embodiment, the central server may send out the notification to all registered users 120 of the data file 132. The notification may include details regarding the requested data interaction including a type of the data interaction, a data and time of the request 150 for the data interaction, a type of user device 110 used for initiating the request 150 etc. When a user 120 receives notification regarding an attempt for a data interaction not initiated by the user 120, the user may take appropriate actions to report and/or stop the data interaction from being processed further. For example, the user 120 may block all data interactions associated with the data file 132 using an application on the user device 110 and/or call a representative of the central server 130 to report that a fraudulent data interaction being attempted.

Figure 2:
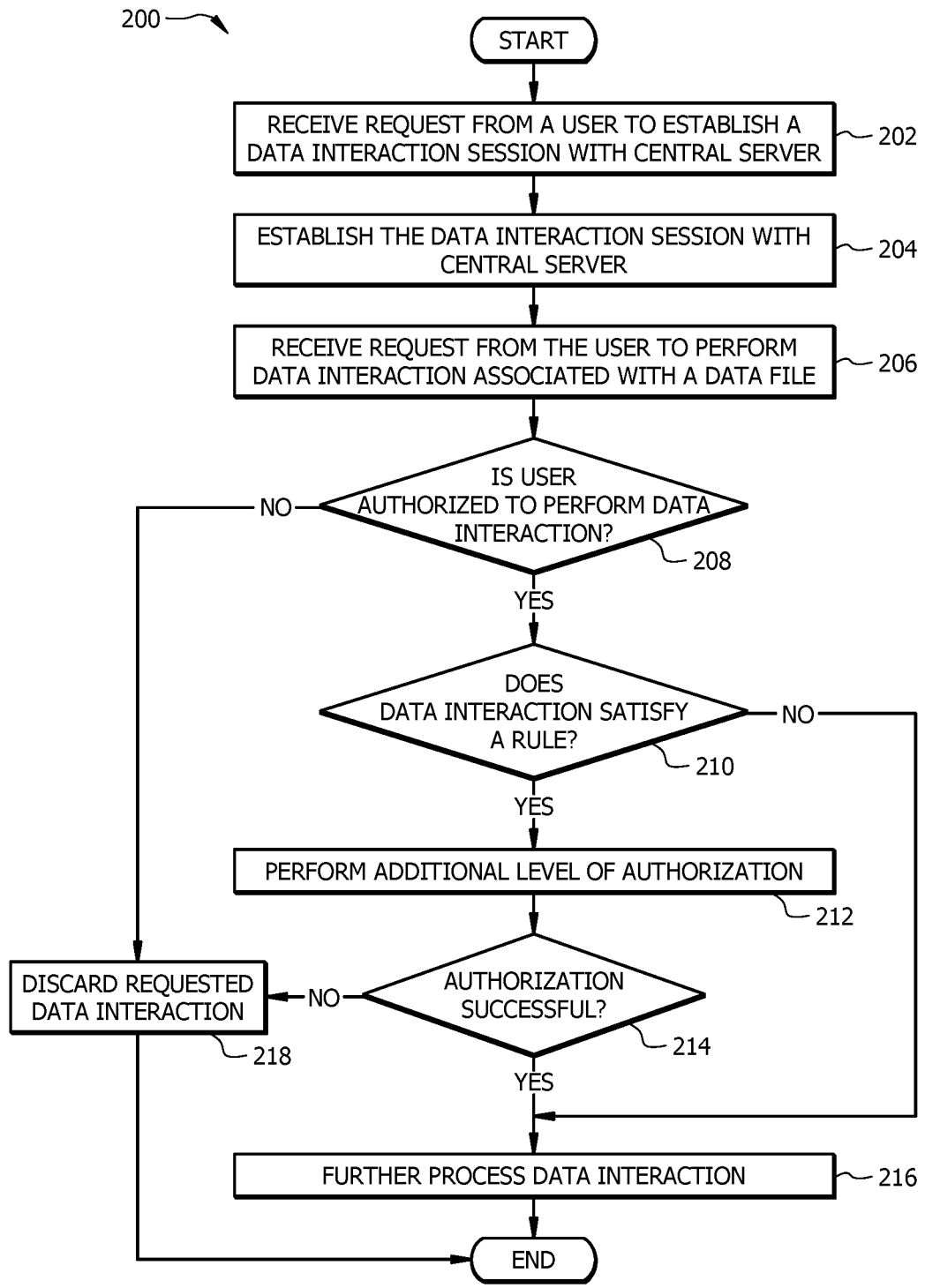
FIG. 2 is a flowchart of an example method for performing multi-factor authorization of data interactions, in accordance with certain embodiments of the present disclosure.

FIG. 2 is a flowchart of an example method 200 for performing multi-factor authorization of data interactions, in accordance with certain embodiments of the present disclosure. Method 200 may be performed by a central data server 130 as shown in FIG. 1 and described above.

At operation 202, central server 130 receives a request initiated by a user 120 to establish a data interaction session 140 associated with a data file 132, based on authentication credentials of the user.

At operation 204, central server 130 establishes the data interaction session 140 for the user based on the authentication credentials.

As described above, user 120 may establish an interaction session 140 at central server 130 using a software application provided at the user device 110. In one embodiment, the software application may be a dedicated application designed for interaction with the central server 130. In alternative embodiments, the user may access the central server 130 using a web portal. To request the interaction session 140 at the central server 130, the user 120 may provide authentication credentials to the central server 130 via the user device 110. In one example, the authentication credentials include an initial username and password registered for the user 120 at the central server 130. For example, the user 120 may enter the username and password on a login page displayed on a display of the user device 110. The central server 130 may verify the identity of the user 120 based on the provided authentication credentials. Once the identity of the user 120 is authenticated, the central server 130 may open an interaction session 140 for the user 120. The user 120 may manage the interaction session 140 at the central server 130 using the user device 110.

At operation 206, after establishing the data interaction session 140 for the user 120, central server 130 receives a request (e.g., data interaction request 150) initiated by the user for a data interaction associated with the data file 132.

As described above, once the interaction session 140 is established at the central server 130, the user 120 may initiate one or more data interactions associated with the data file 132 by transmitting a data interaction request 150 to the central server 130. For example, the central server 130 may offer a number of data interactions related to the data file 132. As described above, the data interactions may include, but are not limited to, viewing a status of the data file 132 (e.g., number of data objects stored in the data file 132), generating a report relating to data interactions related to the data file 132 previously processed in a given time period, transferring data (e.g., a requested number of data objects) from the data file 132, transferring data (e.g., a requested number of data objects) into the data file 132, configuring user authorizations 134, defining user configured rules 136, and modifying user data including contact details, passwords etc.

At operation 208, central server 130 checks whether the user is authorized to perform the requested data interaction.

As described above, central server 130 may check whether the user 120 is authorized to perform a data interaction associated with the data file 132 as requested by the user 120. Upon receiving a request 150 initiated by user 120 for a data interaction associated with the data file 132, the central server 130 may search a list of user authorizations 134 for an authorization level of the requesting user 120 based on authentication credentials provided by the user 120 at the time of setting up the current interaction session 140 at the central server 130. As described above, the user authorizations 134 may include authorization information of each registered user 120 mapped to a unique identity (e.g., authentication credentials) of the user 120 as registered with the central server 130. Based on the authentication credentials of the user 120, the central server 130 may examine the data interactions the user 120 is authorized to perform with regard to the data file 132, and may determine whether the user 120 is authorized to perform the requested data interaction. The central server 130 may allow further processing of the requested data interaction when the user 120 is determined to have authorization to perform the requested data interaction with regard to the data file 132. For example, a user 120 may open an interaction session 140 at the central server 130 by providing a username and password registered for the user 120 at the central server 130. Once the interaction session 140 is open, the user may request (e.g. by transmitting a data interaction request 150) that a certain amount of data is transferred from the data file 132 to another data file (not shown) stored at the central server or to another data server (not shown) connected to network 170. In response to receiving the request 150 for the data transfer, the central server 130 may search the user authorizations 134 based on the username of the user 120 to determine an authorization level of the user 120. As described above, for each registered user 120, user authorizations 134 may include one or more data interactions the user 120 is authorized to perform with regard to the data file 132. Based on the authorization level of the user as determined from the user authorizations 134, the central server 130 may determine whether the user 120 is authorized to perform the requested data transfer from the data file 132.

In one or more embodiments, the authorization level of the user may impose limits on certain data interactions the user is authorized to perform. For example, a user 120 may not be authorized to transfer data out of the data file that exceeds a pre-set amount of data (e.g., a pre-set number of data objects).

When the central server determines (at operation 208) that the user 120 is not authorized to perform the requested data interaction associated with data file 132, method 200 proceeds to operation 218, where central server 130 discards the request 150 of the data interaction. However, when the central server determines that the user 120 is authorized to perform the requested data interaction, method 200 proceeds to operation 210.

At operation 210, in response to determining that the user 120 is authorized to perform the requested data interaction, central server 130 checks whether the requested data interaction satisfies at least one user-configured rule 136 defined for the user 120. If the central server 130 determines that the requested data interaction does not satisfy a user-configured rule 136, method 200 proceeds to operation 216, where central server 130 processes the data interaction. For example, if the requested data interaction includes a request for data transfer from the data file 132, the central server 130 proceeds to transfer the requested amount of data to the requested destination (e.g., another data file). However, if the central server 130 determines that the requested data interaction satisfies a user-configured rule 136, method 200 proceeds to operation 212, where central server 130 performs an additional level of authorization.

As described above, central server 130 may perform enhanced user authorization 160 including performing one or more additional levels of user authorization to verify the identity of the user before processing a requested data interaction associated with the data file 132. The additional level of user authorization may include, but is not limited to, one or more of requesting a One Time Password (OTP) previously sent to at least one registered user device 110 of the user 120, requesting a biometric identification of the first user, requesting a registered data interaction password, requesting an answer to a pre-set secret question and requesting confirmation of an identity of the user 120 over a phone call. It may be appreciated that the additional level of user authorization may include any other known method of user authorization Central server 130 may trigger an additional level of user authorization based on one or more user-configured rules 136. Each user-configured rule 136 may be set by a registered user 120 and specifies at least one condition for triggering the additional user authorization. Each user-configured rule 136 is associated with at least one type of data interaction and specifies at least one condition for triggering additional authorization to process a requested data interaction of the at least one type. The different types of data interactions may include, but are not limited to, viewing a status of the data file 132 (e.g., number of data objects stored in the data file 132), generating a report relating to data interactions related to the data file 132 previously processed in a given time period, transferring data (e.g., a requested number of data objects) from the data file 132, transferring data (e.g., a requested number of data objects) into the data file 132, configuring user authorizations 134, defining user-configured rules 136, and modifying user data including contact details, passwords etc. When the at least one condition is met for a requested data interaction, the central server 130 may perform an additional level of authorization using one or more authorization methods and further process the requested data interaction upon successfully authorizing the identity of the user 120 based on the additional level of authorization. For example, a user-configured rule 136 may specify that any data transfer from the data file 132 that equals or exceeds a preset amount of data (e.g., preset number of data objects) is to trigger additional authorization. In this example, "data transfer" is the type of data interaction, and the condition set by the user configured rule 136 is that "transfer from the data file 132 equals or exceeds a preset amount of data". Thus, each time a data transfer from the data file 132 is requested that equals or exceeds the preset number of data objects, the central server 130 may trigger and perform the additional authorization. In one or more embodiments, a single user-configured rule 136 may apply to multiple types of data interactions. For example, a user-configured rule 136 may specify that any data transfer from the data file 132 or data transfer into the data file 132 that equals or exceeds a preset number of data objects is to trigger additional authorization.

When multiple users 120 are registered to perform data interactions associated with same data file 132, different user-configured rules 136 may be defined for each of the multiple users 120 with respect to the same type of data interaction associated with the data file 132. For example, a first user-configured rule 136 defined for a first registered user may specify that any data transfer initiated by the first user from the data file 132 that equals or exceeds a first amount of data (e.g., first number of data objects) is to trigger additional authorization. A second user-configured rule 136 defined for a second registered user may specify that any data transfer initiated by the second user from the data file 132 that equals or exceeds a second amount of data (e.g., second number of data objects is to trigger additional authorization. The second amount of data may be different from the first amount of data. In one embodiment, a user 120 registered as a primary user of the data file 132 may be authorized to define the user-configured rules 136 for all users 120 of the data file 132. In an alternative embodiment, a user 120 registered as a secondary user of the data file may define additional user-configured rules 136 for the secondary user in addition to one or more user-configured rules 136 set for the secondary user by the primary user.

The central server 130 may store each user-configured rule 136 mapped to the authentication credentials of the user 120 to which the user-configured rule 136 applies. For example, the first user-configured rule 136 may map to the username of the first user and the second user-configured rule 136 may map to the username of the second user. The central server 130 may search for user-configured rules 136 defined for a particular user based on the authentication credentials (e.g., username) of the user.

In one example, the central server 130 may search the user configured rules 136 (e.g., based on the username of the requesting user 120) to determine whether a user-configured rule 136 is defined for the user 120 relating to the type of the data interaction requested by the user 120. Based on the search, central server 130 may determine that a user-configured rule 136 is defined for the user relating to the type of the requested data interaction. The central server 130 may check whether the requested data interaction satisfies the condition of the user-configured rule 136 to perform the data interaction. When the requested data interaction satisfies the condition of the user-configured rule 136, central server 130 performs the additional user authorization.

As described above, default rules 138 may be defined to trigger enhanced authorization 160 for certain data interactions associated with the data file 132 which apply to all registered users 120 of the data file 132. In one embodiment, a default rule may be defined to avoid unauthorized access to the data file 132, avoid considerable data loss and/or loss of reputation as a result of losing sensitive data from the data file 132. For example, a default rule 138 may be defined to trigger enhanced authorization 160 for a data transfer from the data file 132 that equals or exceeds a set threshold amount of data. This default rule 138 may be applied to every registered user 120 of the data file 132 who requests a data transfer from the data file 132. The threshold amount of the default rule may be set to a data amount (e.g., number of data objects) which, if lost, may be generally considered high value data loss. In another example, a default rule 138 may be defined to trigger enhanced authorization 160 for access to sensitive data including personal user information and/or information related to the data file 132. In an embodiment, the default rules 138 may be set by an administrator of the central server 130.

Default rules 138 may include location-based rules that trigger enhanced authorization 160 when a data interaction associated with the data file 132 is initiated from a suspicious location. The central server 130 may determine a geographical location of a user device 110 used to initiate a data interaction based on several methods including, but not limited to, geo-location data received from the user device 110 and an internet protocol (IP address) of the user device 110. When a location of the user device 110 is found to be suspicious (e.g., outside a country of usual operation), the central server 130 may trigger the enhanced authorization 160. In another example, when two different user devices 110 use the same user authentication credentials to establish data interaction sessions 140 from two distant geographical locations within a relatively short time period, the central server 130 may determine the activity as suspicious and trigger enhanced authorization 160.

In one or more embodiments, a default rule 138 defined for a particular type of data interaction may be overridden by a user-configured rule 136 defined for a particular user 120 in relation to the same type of data interaction. In one embodiment, the user-configured rule 136 may override a default rule 138 when the user-configured rule 136 defines a higher security standard for triggering the enhanced authorization 160 for the same type of data interaction. For example, a default rule 138 may specify that enhanced authorization 160 is triggered when a requested data transfer (e.g., by any user) from the data file 132 equals or exceeds 1000 data objects. A user-configured rule 136 defined for a first user of the data file 132 may specify that the enhanced authorization 160 is triggered when the requested data transfer, when initiated by the first user, equals or exceeds 500 data objects. In this case, since the user-configured rule 136 sets a higher security standard by requiring that the enhanced authorization 160 is triggered for a lower data threshold as compared to the higher data threshold set by the default rule, the central server 130 may ignore the default rule 138 for the first user and implement the user-configured rule 136. In one embodiment, a user-configured rule 136 may not override a default rule 138 when the user-configured rule 136 sets a lower security standard for a data interaction. For example, when the default rule 138 sets the threshold data amount for the data transfer at 1000 data objects and the user-configured rule 136 sets the threshold data amount to 1500 data objects, the central server 130 may implement the default rule 138 instead of the user-configured rule 136 for the first user.

At operation 214, central server 130 checks whether the additional level of authorization was successful. For example, the central sever 130 determines whether an identity of the user was successfully verifies based on one or more method of authorization. When the central server 130 determines that the additional authorization was not successful, method 200 proceeds to operation 218 where central server 130 discards the requested data interaction. However, when the additional authorization is determined to be a success (e.g., user identity was successfully verified), method 200 proceeds to operation 216, where central server 130 processes the requested data interaction.

In one or more embodiments, the central server 130 may send out a notification to the user device 110 registered for the user 120 at the central server 130, of an attempt for a data interaction associated with the data file 132. The notification notifies a registered user 120 of the data file 132 that a particular data interaction in being attempted. The central server 130 may send out the notification after determining that the requested data interaction satisfies a user-configured rule but before invoking additional authorization based on the user-configured rule and also before fully processing the data interaction. The notification provides another layer of security to the data file 132 in case a perpetrator is able to surpass the multi-factor authorization. The central server 130 may send out the notification to a user device (e.g., a mobile phone) of the user 120 whose authentication credentials were used to initiate the data interaction. In an alternative embodiment, the central server may send out the notification to all registered users 120 of the data file 132. The notification may include details regarding the requested data interaction including a type of the data interaction, a data and time of the request for the data interaction, a type of user device 110 used for initiating the request etc. When a user 120 receives notification regarding an attempt for a data interaction not initiated by the user 120, the user may take appropriate actions to report and/or stop the data interaction from being processed further. For example, the user 120 may block all data interactions associated with the data file 132 using an application on the user device 110 and/or call a representative of the central server 130 to report that a fraudulent data interaction being attempted.

In a particular use case involving financial services, the central server 130 may be owned and operated by a bank or other financial institution. The data file 132 may correspond to a financial account of a user 120. Data interactions requested by the user 120 may correspond to data transactions relating to the financial account of the user. Data (e.g., data objects) stored in the data file 132 may correspond to funds stored in the user account. In one example, a user may open an interaction session 140 with the central server 130 of the financial institution by entering a username and password registered with the financial institution. Once the session is established at the central server 130, the user 120 may initiate transactions related to the financial account. The transactions may include, but are not limited to, funds transfer from the financial account, funds transfer into the financial account, and generating account statements. For example, when the user 120 requests funds transfer from the financial account, the central server 130 first checks whether the user is authorized to perform fund transfers based on user authorizations 134. If the user 120 is determined to be authorized to perform fund transfers, central server 130 checks for user-configured rules 136 defined for the user 120 based on the username of the user 120. If a user-configured rule 136 exists for the user 120 relating to fund transfers, central server 130 determines whether the requested funds transfer satisfies a condition defined by the user-configured rule 136. For example, the user-configured rule may specify that additional authorization is required when fund transfers equal or exceed $1000. If the requested funds transfer equals or exceeds $1000, central server 130 performs an additional level of authorization. The central server 130 may process the requested funds transfer if the additional authorization is successful. In one embodiment, to provide an additional layer of security, the central server 130 may notify the user of the requested funds transfer after the additional authorization is successful but before processing the funds transfer. The notification may provide the user 120 with an opportunity to block all data transactions associated with the financial account (e.g., using online access to financial account) and/or call a representative of the financial institution to report a fraudulent data interaction being attempted.

Figure 3:
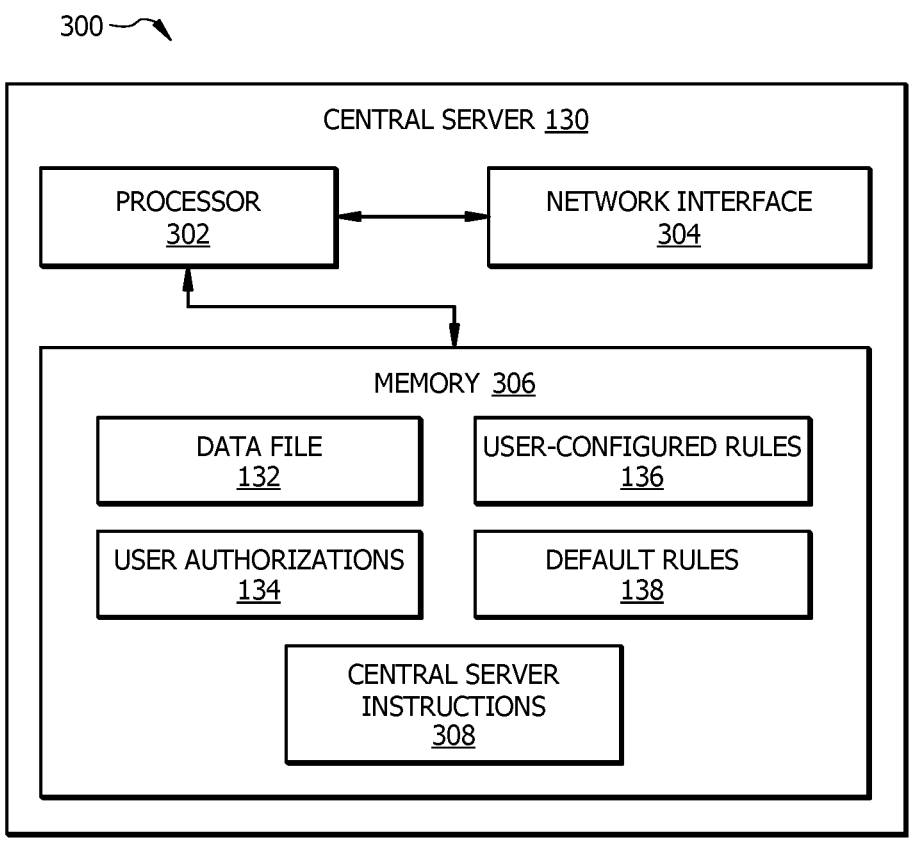
FIG. 3 illustrates an example schematic diagram of the central server illustrated in FIG. 1, in accordance with one or more embodiments of the present disclosure.

FIG. 3 illustrates an example schematic diagram of the central data server 130 illustrated in FIG. 1, in accordance with one or more embodiments of the present disclosure.

Central server 130 includes a processor 302, a memory 306, and a network interface 304. The central server 130 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., central server instructions 308) to implement the central server 130. In this way, processor 302 may be a special-purpose computer designed to implement the functions disclosed herein. In one or more embodiments, the central server 130 is implemented using logic units, FPGAs, ASICs, DSPs, or any other suitable hardware. The central server 130 is configured to operate as described with reference to FIGS. 1-2. For example, the processor 302 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store data file 132, user authorizations 134, user-configured rules 136, default rules 138 and the central server instructions 308. The central server instructions 308 may include any suitable set of instructions, logic, rules, or code operable to execute the central server 130.

The network interface 304 is configured to enable wired and/or wireless communications. The network interface 304 is configured to communicate data between the central server 130 and other devices, systems, or domains (e.g. user devices 110). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that each user device 110 may be implemented similar to the central server. For example, a user device 110 may include a processor and a memory storing instructions to implement the respective functionality of the user device 110 when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   at least one user device for initiating one or more data interactions associated with a data file; and
   a central server communicatively coupled to the at least one user device and configured to:
      receive from the at least one user device, a request initiated by a first user to establish a data interaction session associated with the data file based on authentication credentials of the first user;
      establish the data interaction session for the first user based on the authentication credentials;
      receive from the at least one user device after establishing the data interaction session, a request initiated by the first user for a first data interaction associated with the data file;
      check whether the first user is authorized to perform the first data interaction, wherein the check comprises:
         search a list of user authorizations based on at least a portion of the authentication credentials of the first user; and
         determine, based on the search, at least one data interaction associated with the data file the first user is authorized to perform;
      determine, based on the check, that the first user is authorized to perform the first data interaction;
      in response to the determining, check whether a rule is defined to trigger an additional level of authorization for the first user relating to a type of the first data interaction associated with the data file, wherein the type of the first data interaction may comprise one or more of viewing a status of the data file, generating a report of data interactions related to the data file previously processed in a given time period, transferring data from the data file, transferring data into the data file, configuring user authorizations for the data file, defining user configured rules related to the data file, and modifying user data stored in the data file;
      determine that a first rule is defined to trigger the additional level of authorization for the first user relating to transfer of data objects from the data file requested by the first user, wherein:
         the first rule requires that the additional level of authorization is performed for the first user before processing the transfer of data objects from the data file when a first condition is met for the transfer of the data objects from the data file;
         the first condition is met when the data objects requested by the first user for the transfer from the data file equals or exceeds a first amount of data objects;
         the first rule is different from a second rule defined to trigger the additional level of authorization for a second user relating to transfer of data objects from the same data file requested by the second user;
         the second rule requires that the additional level of authorization is performed for the second user before processing a transfer of data objects from the data file requested by the second user when a second condition is met for the transfer of the data objects from the data file; and
         the second condition is met when the data objects requested by the second user for the transfer from the data file equals or exceeds a second amount of data objects, wherein the first user is different from the second user and the first amount is different from the second amount;
check whether the first data interaction satisfies the first condition of the first rule to perform the type of the first data interaction;
determine that the first data interaction satisfies the first condition;
in response, trigger the additional level of authorization, wherein the additional level of authorization comprises confirming an identity of the first user by at least one authorization method;
detect that the additional level of authorization was successful; and
in response to the detection, process the first data interaction.

2. The system of claim 1, wherein the central server is further configured to:
in response to determining that the first data interaction satisfies the first condition and before triggering the additional level of authorization, transmit a notification to the at least one user device indicating that the first user is attempting to perform the first data interaction.

3. The system of claim 1, wherein the central server is further configured to:
receive a user configuration of the first rule for performing the type of data interaction associated with the data file; and
set the first rule for the type of data interaction based on the received user configuration.

4. The system of claim 1, wherein:
the first rule is a user configured rule; and
the central server is further configured to:
detect a default rule set for the type of data interaction, wherein the default rule requires that the additional level of authorization is triggered when each data interaction of the type includes transferring from the data file, data that equals or exceeds a second threshold data amount;
detect that the second threshold data amount is higher than the first amount of data objects; and
in response, ignore the default rule.

5. The system of claim 1, wherein the central server is further configured to:
receive a request initiated by the second user for a second data interaction associated with the data file, wherein the second data interaction is of the same type as the first data interaction initiated by the first user;
check whether the second user is authorized to perform the second data interaction;
determine, based on the check, that the second user is authorized to perform the second data interaction;
in response to the determining, check whether the second data interaction satisfies the second rule for the second user to perform data interactions of the same type;
determine that the second data interaction satisfies the second rule;
in response, trigger the additional level of authorization for the second user;
detect that the additional level of authorization was successful; and
in response to the detection, process the requested second data interaction.

6. The system of claim 1, wherein the additional level of authorization comprises one or more of requesting a One Time Password (OTP) previously sent to the at least one user device, requesting a biometric identification of the first user, requesting a data interaction password, requesting an answer to a pre-set secret question and requesting confirmation of an identity of the first user over a phone call.

7. A method for operating a central server, comprising:
receiving a request initiated by a first user to establish a data interaction session associated with a data file based on authentication credentials of the first user;
establishing the data interaction session for the first user based on the authentication credentials;
receiving after establishing the data interaction session, a request initiated by the first user for a first data interaction associated with the data file;
checking whether the first user is authorized to perform the first data interaction, comprising:
searching a list of user authorizations based on at least a portion of the authentication credentials of the first user; and
determining, based on the search, at least one data interaction associated with the data file the first user is authorized to perform;
determining, based on the checking, that the first user is authorized to perform the first data interaction;
in response to the determining, checking whether a rule is defined to trigger an additional level of authorization for the first user relating to a type of the first data interaction associated with the data file, wherein the type of the first data interaction may comprise one or more of viewing a status of the data file, generating a report of data interactions related to the data file previously processed in a given time period, transferring data from the data file, transferring data into the data file, configuring user authorizations for the data file, defining user configured rules related to the data file, and modifying user data stored in the data file;
determining that a first rule is defined to trigger the additional level of authorization for the first user relating to transfer of data objects from the data file requested by the first user, wherein:
the first rule requires that the additional level of authorization is performed for the first user before processing the transfer of data objects from the data file when a first condition is met for the transfer of the data objects from the data file;
the first condition is met when the data objects requested by the first user for the transfer from the data file equals or exceeds a first amount of data objects;
the first rule is different from a second rule defined to trigger the additional level of authorization for a second user relating to transfer of data objects from the same data file requested by the second user;
the second rule requires that the additional level of authorization is performed for the second user before processing a transfer of data objects from the data file requested by the second user when a second condition is met for the transfer of the data objects from the data file; and
the second condition is met when the data objects requested by the second user for the transfer from the data file equals or exceeds a second amount of data objects, wherein the first user is different from the second user and the first amount is different from the second amount;
checking whether the first data interaction satisfies the first condition of the first rule to perform the type of the first data interaction;

determining that the first data interaction satisfies the first condition;
in response, triggering the additional level of authorization, wherein the additional level of authorization comprises confirming an identity of the first user by at least one authorization method;
detecting that the additional level of authorization was successful; and
in response to the detecting, processing the first data interaction.

8. The method of claim 7, further comprising:
in response to determining that the first data interaction satisfies the first condition and before triggering the additional level of authorization, transmitting a notification indicating that the first user is attempting to perform the first data interaction.

9. The method of claim 7, further comprising:
receiving a user configuration of the first rule for performing the type of data interaction associated with the data file; and
setting the first rule for the type of data interaction based on the received user configuration.

10. The method of claim 7, wherein:
the first rule is a user configured rule; and
further comprising:
detecting a default rule set for the type of data interaction, wherein the default rule requires that the additional level of authorization is triggered when each data interaction of the type includes transferring from the data file, data that equals or exceeds a second threshold data amount;
detecting that the second threshold data amount is higher than the first amount of data objects; and
in response, ignore the default rule.

11. The method of claim 7, further comprising:
receiving a request initiated by the second user for a second data interaction associated with the data file, wherein the second data interaction is of the same type as the first data interaction initiated by the first user;
checking whether the second user is authorized to perform the second data interaction;
determining, based on the check, that the second user is authorized to perform the second data interaction;
in response to the determining, checking whether the second data interaction satisfies the second rule set for the second user to perform data interactions of the same type;
determining that the second data interaction satisfies the second rule;
in response, triggering the additional level of authorization for the second user;
detecting that the additional level of authorization was successful; and
in response to the detecting, processing the requested second data interaction.

12. A non-transitory computer-readable medium storing instructions that when processed by at least one hardware processor cause the hardware processor to:
receive a request initiated by a first user to establish a data interaction session associated with a data file based on authentication credentials of the first user;
establish the data interaction session for the first user based on the authentication credentials;
receive after establishing the data interaction session, a request initiated by the first user for a first data interaction associated with the data file;
check whether the first user is authorized to perform the first data interaction, comprising:
searching a list of user authorizations based on at least a portion of the authentication credentials of the first user; and
determining, based on the search, at least one data interaction associated with the data file the first user is authorized to perform;
determine, based on the checking, that the first user is authorized to perform the first data interaction;
in response to the determining, check whether a rule is defined to trigger an additional level of authorization for the first user relating to a type of the first data interaction associated with the data file, wherein the type of the first data interaction may comprise one or more of viewing a status of the data file, generating a report of data interactions related to the data file previously processed in a given time period, transferring data from the data file, transferring data into the data file, configuring user authorizations for the data file, defining user configured rules related to the data file, and modifying user data stored in the data file;
determine that a first rule is defined to trigger the additional level of authorization for the first user relating to transfer of data from the data file requested by the first user, wherein:
the first rule requires that the additional level of authorization is performed for the first user before processing the transfer of data objects from the data file when a first condition is met for the transfer of the data objects from the data file;
the first condition is met when the data objects requested by the first user for the transfer from the data file equals or exceeds a first amount of data objects;
the first rule is different from a second rule defined to trigger the additional level of authorization for a second user relating to transfer of data objects from the same data file requested by the second user;
the second rule requires that the additional level of authorization is performed for the second user before processing a transfer of data objects from the data file requested by the second user when a second condition is met for the transfer of the data objects from the data file; and
the second condition is met when the data objects requested by the second user for the transfer from the data file equals or exceeds a second amount of data objects, wherein the first user is different from the second user and the first amount is different from the second amount;
check whether the first data interaction satisfies the first condition of the first rule to perform the type of the first data interaction;
determine that the first data interaction satisfies the first condition;
in response, trigger the additional level of authorization, wherein the additional level of authorization comprises confirming an identity of the first user by at least one authorization method;
detect that the additional level of authorization was successful; and
in response to the detecting, process the first data interaction.

13. The non-transitory computer-readable medium of claim 12, wherein the instructions further cause the hardware processor to:

in response to determining that the first data interaction satisfies the first condition and before triggering the additional level of authorization, transmit a notification indicating that the first user is attempting to perform the first data interaction.

14. The non-transitory computer-readable medium of claim 12, wherein the instructions further cause the hardware processor to:
   receive a user configuration of the first rule for performing the type of data interaction associated with the data file; and
   set the first rule for the type of data interaction based on the received user configuration.

15. The non-transitory computer-readable medium of claim 12, wherein:
   the first rule is a user configured rule; and
   wherein the instructions further cause the processor to:
      detect a default rule set for the type of data interaction, wherein the default rule requires that the additional level of authorization is triggered when each data interaction of the type includes transferring from the data file, data that equals or exceeds a second threshold data amount;
      detect that the second threshold data amount is higher than the first amount of data objects; and
      in response, ignore the default rule.

* * * * *